United States Patent
Cheng (10) Patent No.: US 11,043,898 B2
(45) Date of Patent: Jun. 22, 2021

(54) SWITCHED TANK CONVERTER WITH LOW VOLTAGE STRESS

(71) Applicant: Chengdu Monolithic Power Systems Co., Ltd., Chengdu (CN)

(72) Inventor: Hao-Chien Cheng, New Taipei (TW)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/695,096

(22) Filed: Nov. 25, 2019

(65) Prior Publication Data

US 2020/0186028 A1 Jun. 11, 2020

(30) Foreign Application Priority Data

Dec. 5, 2018 (CN) .......................... 201811483458.1

(51) Int. Cl.
*H02M 3/158* (2006.01)
*H02M 3/07* (2006.01)
*H02M 1/00* (2006.01)

(52) U.S. Cl.
CPC ............ *H02M 3/158* (2013.01); *H02M 3/07* (2013.01); *H02M 1/0058* (2021.05); *H02M 1/0095* (2021.05)

(58) Field of Classification Search
CPC .......................................... H02M 3/338–3388
See application file for complete search history.

(56) References Cited

U.S. PATENT DOCUMENTS 9,917,517 B1 * 3/2018 Jiang ..................... H02M 3/335
10,122,256 B1 * 11/2018 Babazadeh ........... H02M 7/219
10,778,098 B2 * 9/2020 Yang ....................... H02M 3/07

FOREIGN PATENT DOCUMENTS

CN          103618462 B    * 12/2015

* cited by examiner

*Primary Examiner* — Peter M Novak
(74) *Attorney, Agent, or Firm* — Perkins Coie LLP (57) ABSTRACT

A switched tank converter includes: a first conversion unit and a second conversion unit, each having a clamp capacitor coupled between a first terminal and a third terminal, a high side switch coupled between the first terminal and a switch node, a low side switch coupled between the switch node and a second terminal, and a resonant tank coupled between the switch node and a fourth terminal; and a rectification unit having four rectification switches, wherein a second terminal of the first rectification switch and a first terminal of the third rectification switch are coupled to the fourth terminals of the first and second conversion units, a second terminal of the fourth rectification switch and a first terminal of the second rectification switch are coupled to the third terminals of the first and second conversion units.

10 Claims, 8 Drawing Sheets

FIG. 1

(PRIOR ART)

(MODE 1)

FIG. 4A (MODE 2)

SWITCHED TANK CONVERTER WITH LOW VOLTAGE STRESS

CROSS-REFERENCE TO RELATED APPLICATIONS

This application claims the benefit of Chinese application 201811483458.1, filed on Dec. 5, 2018, and incorporated herein by reference.

TECHNICAL FIELD

The present invention generally relates to electronic circuits, and more particularly but not exclusively, to switched tank converters and control methods thereof.

BACKGROUND

Figure 1:
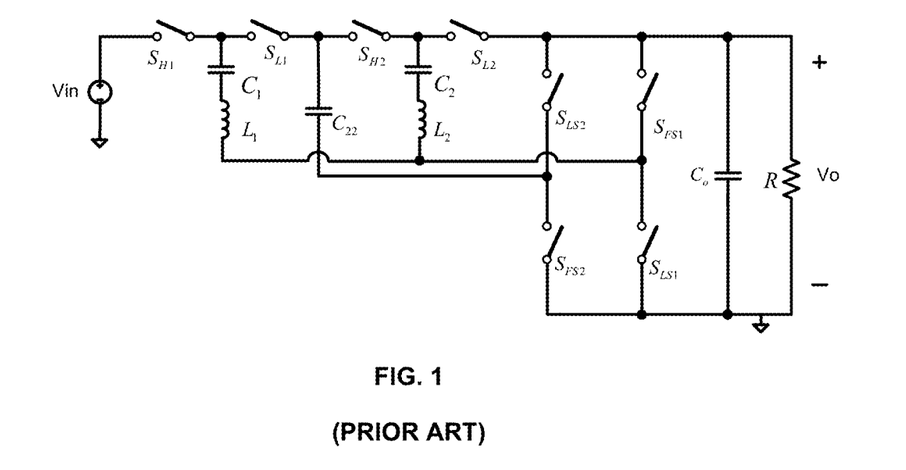
FIG. 1 is a schematic diagram of a conventional switched tank converter.

Compared with traditional switched capacitor converters, switched tank converters work in a resonant state, so there is no current spike. This makes switched tank converters suitable for applications with large output current. FIG. 1 is a schematic diagram of an existing switched tank converter. In this converter, voltage stress applied to each switch is determined by the input voltage Vin, output voltage Vo, and voltage across the capacitor C22, and could even reach the input voltage Vin. This high voltage stress adversely affects cost and also volume of the converter.

SUMMARY

Embodiments of the present invention are directed to a switched tank converter comprising a first conversion unit, a second conversion unit and a rectification unit. Each of the conversion units has a first terminal, a second terminal, a third terminal, a fourth terminal and a switch node. Each of the conversion units includes a clamp capacitor coupled between the first and third terminals, a high side switch coupled between the first terminal and the switch node, a low side switch coupled between the switch node and the second terminal, and a resonant tank coupled between the switch node and the fourth terminal. The second terminal of the first conversion unit is coupled to a first terminal of a load. The second terminal of the second conversion unit is coupled to a second terminal of the load. A first terminal of a power supply is coupled to the first terminal of the load through the first conversion unit. A second terminal of the power supply is coupled to the second terminal of the load through the second conversion unit. The rectification unit has a first rectification switch, a second rectification switch, a third rectification switch and a fourth rectification switch. Each of the rectification switches has a first terminal and a second terminal. The first terminals of the first and fourth rectification switches are coupled to the first terminal of the load. The second terminals of the second and third rectification switches are coupled to the second terminal of the load. The second terminal of the first rectification switch and the first terminal of the third rectification switch are coupled to the fourth terminals of the first and second conversion units. The second terminal of the fourth rectification switch and the first terminal of the second rectification switch are coupled to the third terminals of the first and second conversion units. The switched tank converter has a first mode and a second mode. During the first mode, the high side switch of the first conversion unit, the low side switch of the second conversion unit, the first rectification switch and the second rectification switch are on, while the low side switch of the first conversion unit, the high side switch of the second conversion unit, the third rectification switch and the fourth rectification switch are off. During the second mode, the high side switch of the first conversion unit, the low side switch of the second conversion unit, the first rectification switch and the second rectification switch are off, while the low side switch of the first conversion unit, the high side switch of the second conversion unit, the third rectification switch and the fourth rectification switch are on.

Embodiments of the present invention are also directed to a controller and a control method used in the aforementioned switched tank converter. Based on current flowing through the resonant tanks in the first and second conversion units, the controller determines when to turn on the high side switch of the first conversion unit, the low side switch of the second conversion unit, the first rectification switch and the second rectification switch, and when to turn on the low side switch of the first conversion unit, the high side switch of the second conversion unit, the third rectification switch and the fourth rectification switch. The controller further detects whether current flowing through the first, second, third and fourth rectification switches crosses zero. Based on the detection result, the controller respectively determines when to turn off the low side switch of the second conversion unit and the first rectification switch, when to turn off the high side switch of the first conversion unit and the second rectification switch, when to turn off the low side switch of the first conversion unit and the third rectification switch, and when to turn off the high side switch of the second conversion unit and the fourth rectification switch.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

Figure 2A:
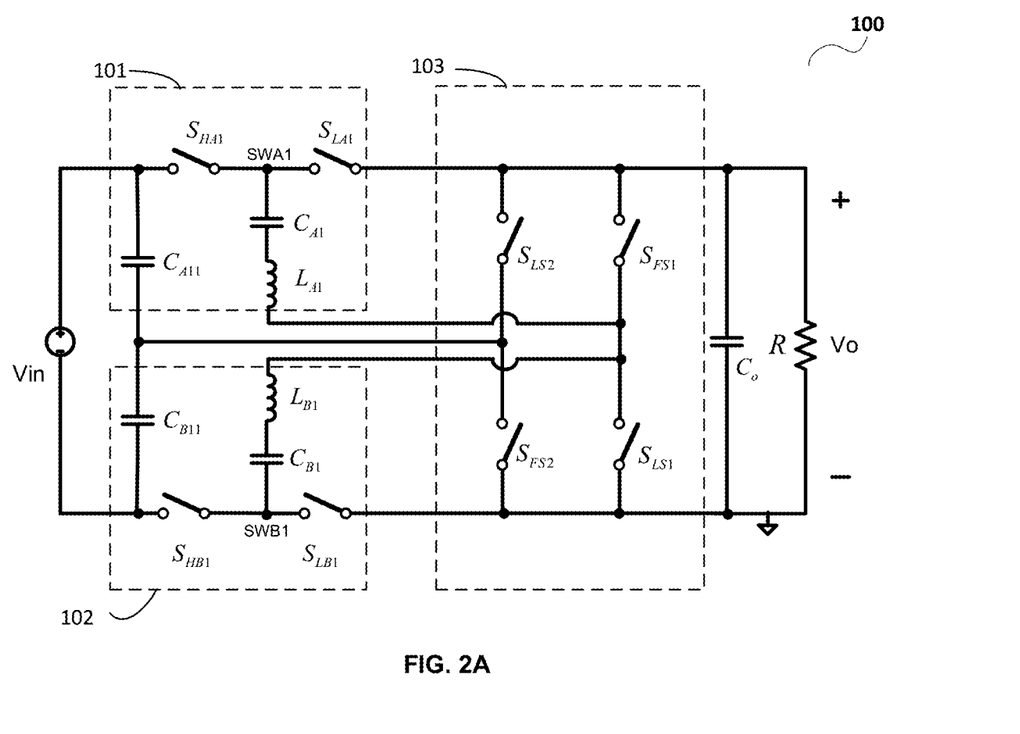
FIG. 2A schematically illustrates a switched tank converter 100 in accordance with an embodiment of the present invention.

FIG. 2A schematically illustrates a switched tank converter 100 in accordance with an embodiment of the present invention. It includes a first conversion unit 101, a second conversion unit 102, a rectification unit 103, and an output capacitor Co. The converter 100 receives an input voltage Vin from a power supply, and then converts the input voltage Vin into an output voltage Vo which is provided to a load R. The output capacitor Co is connected to the load R in parallel.

Figure 2B:
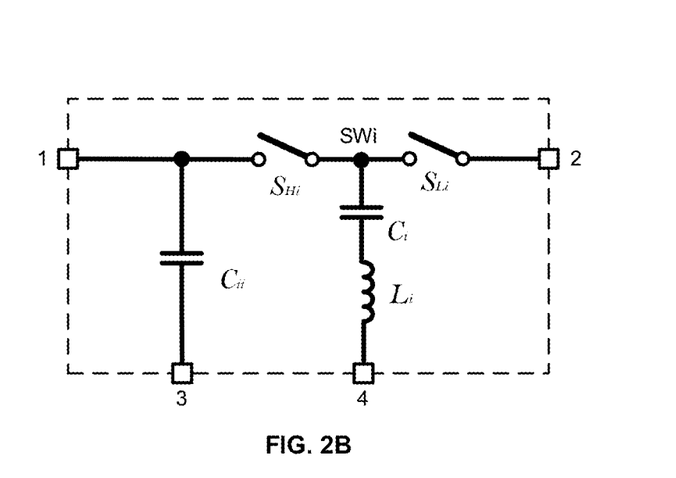
FIG. 2B schematically illustrates a conversion unit in the switched tank converter 100, in accordance with an embodiment of the present invention.

The conversion units 101 and 102 have similar internal structures. As can be seen from FIG. 2B, each of the conversion units has a first terminal, a second terminal, a third terminal, a fourth terminal, and a switch node, and each includes a clamp capacitor coupled between the first terminal and the third terminal, a high side switch coupled between the first terminal and the switch node, a low side switch coupled between the switch node and the second terminal, and a resonant tank coupled between the switch node and the fourth terminal. Specifically, as shown in FIG. 2A, the first conversion unit 101 includes a first clamp capacitor CA11, a first high side switch SHA1, a first low side switch SLA1, and a first resonant tank. The second conversion unit 102 includes a second clamp capacitor CB11, a second high side switch SHB1, a second low side switch SLB1, and a second resonant tank. The first terminal of the first conversion unit 101 is coupled to a first terminal of the power supply to receive the input voltage Vin, and the second terminal of the first conversion unit 101 is coupled to a first terminal of the load R to provide the output voltage Vo. The first terminal of the second conversion unit 102 is coupled to a second terminal of the power supply, and the second terminal of the second conversion unit 102 is coupled to a second terminal of the load R.

The rectification unit 103 includes rectification switches SFS1, SFS2, SLS1 and SLS2. wherein each of the rectification switches has a first terminal and a second terminal. The first terminals of SFS1 and SLS2 are coupled to the first terminal of the load R, the second terminals of SFS2 and SLS1 are coupled to the second terminal of the load R. The second terminal of SFS1 and the first terminal of SLS1 are coupled to the fourth terminals of the conversion units 101 and 102, the second terminal of SLS2 and the first terminal of SFS2 are coupled to the third terminals of the conversion units 101 and 102.

In the embodiment shown in FIG. 2A, the first resonant tank includes a first resonant capacitor CA1 and a first resonant inductor LA1 connected in series, and the second resonant tank includes a second resonant capacitor CB1 and a second resonant inductor LB1 connected in series. However, those of ordinary skills in the art can understand that, the resonant tank could also adopt other resonant structures, without departing from the spirit of the present invention.

Figure 3:
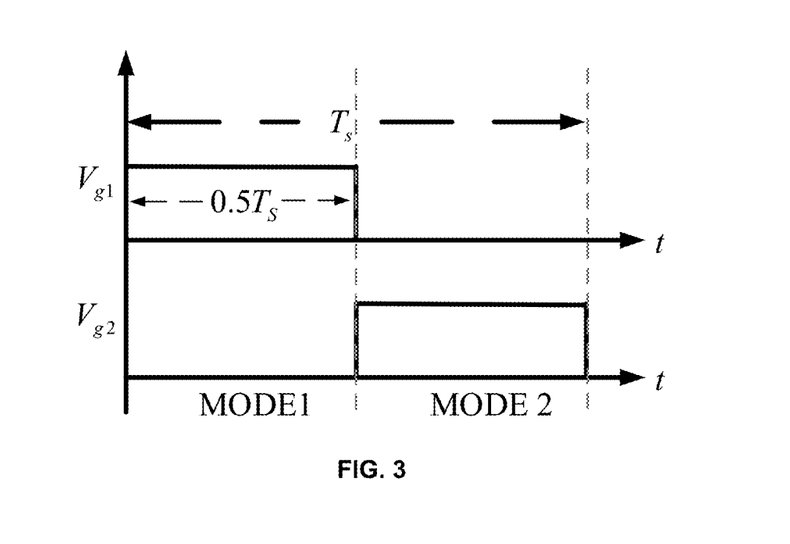
FIG. 3 illustrates waveforms of control signals in the switched tank converter 100, in accordance with an embodiment of the present invention.

The switched tank converter according to embodiments of the present invention could be controlled by control signals with 50% duty cycle, such as signals Vg1 and Vg2 shown in FIG. 3, wherein Ts represents a switching period of the converter. The signal Vg1 is used to control the switches SHA1, SLB1, SFS1 and SFS2, and the signal Vg2 is used to control the switches SLA1, SHB1, SLS1 and SLS2. With dead time ignored, the converter could be deemed as alternately working in mode 1 and mode 2.

Figure 4A:
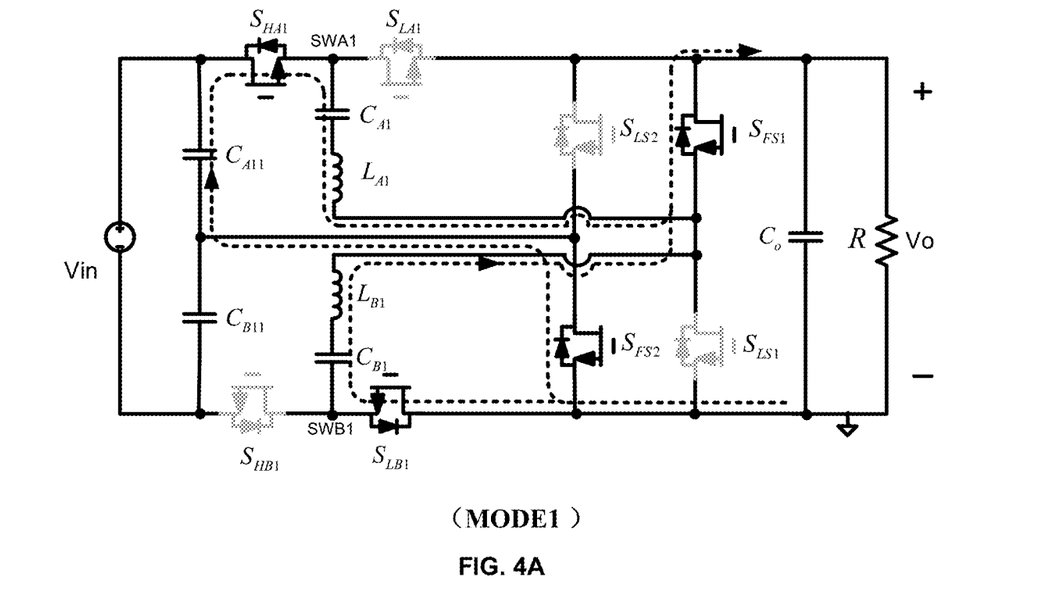
FIG. 4A and FIG. 4B respectively illustrate equivalent circuit of the switched tank converter 100 in different modes, in accordance with an embodiment of the present invention.

In mode 1, as shown in FIG. 4A, the switches SHA1, SLB1, SFS1 and SFS2 are turned on, and the switches SLA1, SHB1, SLS1 and SLS2 are turned off. Energy stored in the capacitor CA11 is discharged to the capacitor CA1 and the load R. An equivalent resonant circuit of the path includes an equivalent resonant capacitor Ceq1-A1 and the inductor LA1, wherein the equivalent resonant capacitor Ceq1-A1 can be expressed as:

$$C_{eq1\text{-}A1}=C_{A11}//C_{A1}//C_o$$

Energy stored in the capacitor CB1 is discharged to the load R. An equivalent resonant circuit of the path includes an equivalent resonant capacitor Ceq1-B1 and the inductor LB1, wherein the equivalent resonant capacitor Ceq1-B1 can be expressed as:

$$C_{eq1\text{-}B1}=C_{B1}//C_o$$

The voltage across the switch SLA1 is clamped to $(V_{CA11}-V_o)$, and the voltage across the switch SHB1 is clamped to be equal to $V_{CB11}$. The voltage across the switches SLS1 and SLS2 are clamped to be equal to the output voltage Vo.

Figure 4B:
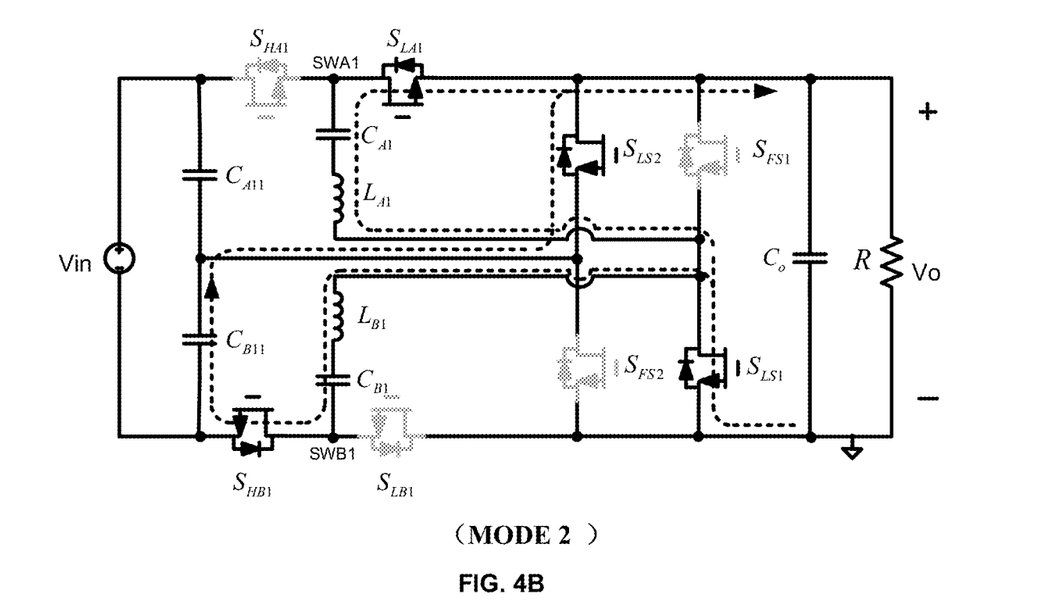

In mode 2, as shown in FIG. 4B, the switches SHA1, SLB1, SFS1 and SFS2 are turned off, and the switches SLA1, SHB1, SLS1 and SLS2 are turned on. Energy stored in the capacitor CB11 is discharged to the capacitor CB1 and the load R. An equivalent resonant circuit of the path includes an equivalent resonant capacitor Ceq2-B1 and the inductor LB1, wherein the equivalent resonant capacitor Ceq2-B1 can be expressed as:

$$C_{eq2\text{-}B1}=C_{B11}//C_{B1}//C_o$$

Energy stored in the capacitor CA1 is discharged to the load R. An equivalent resonant circuit of the path includes an equivalent resonant capacitor Ceq2-A1 and the inductor LA1, wherein the equivalent resonant capacitor Ceq2-A1 can be expressed as:

$$C_{eq2\text{-}A1}=C_{A1}//C_o$$

The voltage across the switch SLB1 is clamped to $(V_{CB11}-V_o)$, and the voltage across the switch SHA1 is clamped to be equal to $V_{CA11}$. The voltage across the switches SFS1 and SFS2 are clamped to be equal to the output voltage Vo.

Regarding the converter 100, it can be derived in accordance with the charge conservation principle of capacitor that:

$$V_o = \frac{V_{in}}{4}$$

With voltage ripple ignored, the voltage across the capacitors CA11 and CB11 can be expressed as:

$$V_{CA11} = V_{CB11} = \frac{V_{in}}{2}$$

The voltage stress sustained by the resonant capacitors CA1 and CB1 can be expressed as:

$$V_{CA1} = V_{CB1} = \frac{V_{in}}{4}$$

Compared with the prior art shown in FIG. 1, the voltage stress of the clamp capacitors and resonant capacitors in the converter 100 are significantly reduced. Therefore, both volume and cost of the converter could be effectively reduced.

In order to achieve zero current switching, frequency of the aforementioned control signals Vg1 and Vg2 is typically set to be equal to a resonant frequency of the equivalent resonant circuits. However, since configurations of the equivalent resonant circuits are different, and resonant elements contained therein have inherent manufacture deviation, it is difficult to realize zero current switching for all the switches. A commonly used solution is to set capacitance of the capacitors CA11 and CB11 to be much higher than that of the capacitors CA1 and CB1, so as to reduce the resonance frequency difference between the equivalent resonant circuits. However, this will undoubtedly increase the volume of the resonant tank converter.

Figure 5:
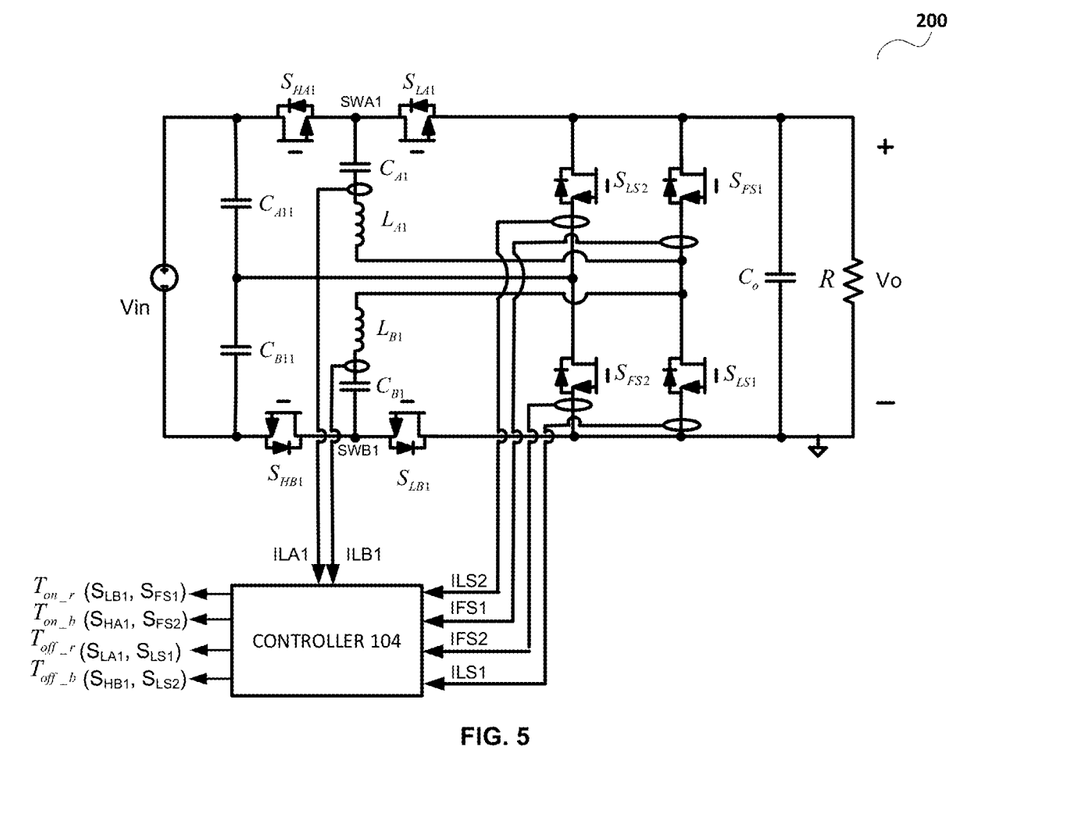
FIG. 5 schematically illustrates a switched tank converter 200 in accordance with an embodiment of the present invention.

To solve the above problem, a new control method is further proposed in the present invention. FIG. 5 schematically illustrates a switched tank converter 200 in accordance with an embodiment of the present invention, wherein based on current ILA1 flowing through the first resonant tank, current ILB1 flowing through the second resonant tank, and current IFS1, IFS2, ILS1, and ILS2 respectively flowing through the rectification switches, a controller 104 generates control signals Ton_r, Ton_b, Toff_r, and Toff_b. Ton_r is used to control the switches SLB1 and SFS1, Ton_b is used to control the switches SHA1 and SFS2, Toff_r is used to control the switches SLA1 and SLS1, Toff_b is used to control the switches SHB1 and SLS2. To be more specific, the controller 104 detects whether the current ILA1 and ILB1 are equal, and determines when to turn on switches SHA1, SLB1, SFS1, and SFS2, and when to turn on the switches SLA1, SHB1, SLS1, and SLS2. The controller 104 also detects whether the current IFS1, IFS2, ILS1, and ILS2 cross zero. Based on the zero cross detection result, the controller 104 determines when to turn off the switches SLB1 and SFS1, when to turn off the switches SHA1 and SFS2, when to turn off the switches SLA1 and SL1, and when to turn off the switches SHB1 and SLS2.

Generally speaking, when a current changes its direction, e.g., from a positive value into a negative value, or from a negative value into a positive value, the current is deemed as crossing zero. The current could be compared with a threshold, which may be equal to or around zero, to detect whether there is a zero cross. For instance, the current could be compared with a threshold slightly higher than zero, where a zero cross of the current might be detected when the current changes from higher than the threshold into lower than the threshold, and vice versa.

Figure 6:
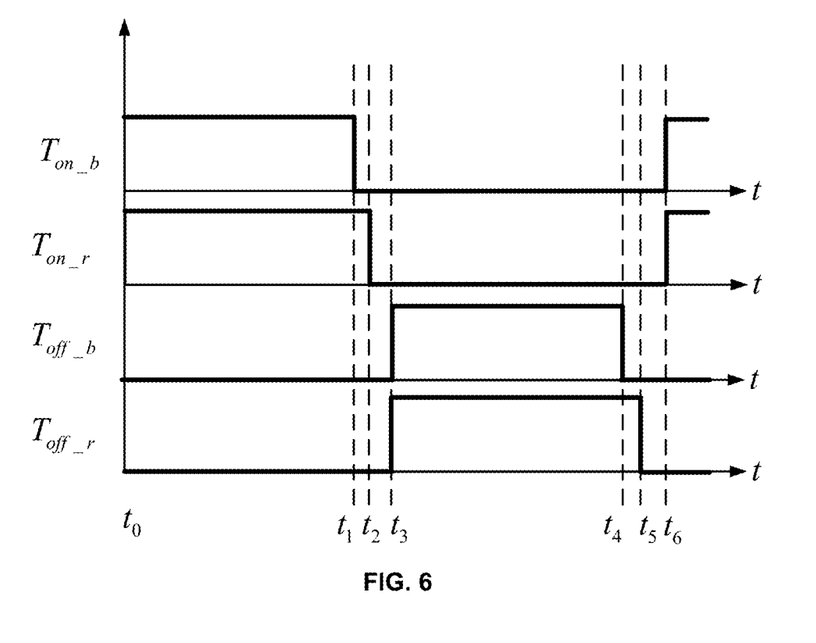
FIG. 6 illustrates waveforms of control signals in the switched tank converter 200, in accordance with an embodiment of the present invention.

The working principle of the switched tank converter 200 shown in FIG. 5 will be further described below with reference to FIG. 6. During t0-t1, the control signals Ton_b and Ton_r are logical high, Toff_b and Toff_r are logical low, the switches SHA1, SLB1, SFS1 and SFS2 are turned on, and the switches SLA1, SHB1, SLS1 and SLS2 are turned off. The converter 200 works in mode 1. The energy stored in the capacitor CA11 is discharged to the capacitor CA1 and the load R, and the energy stored in the capacitor CB1 is discharged to the load R.

At t1, a zero cross of the current IFS2 flowing through the switch SFS2 is detected. The control signal Ton_b is changed into logical low, and the switches SHA1 and SFS2 are turned off. During the subsequent time period until t3, the current ILA1 flows through a body diode of the switch SHA1.

At t2, a zero cross of the current IFS1 flowing through the switch SFS1 is detected, the control signal Ton_r is changed into logical low, and the switches SLB1 and SFS1 are turned off. Subsequently, the current ILB1 completes its commutation during the time period t2-t3.

At t3, the current ILA1 and ILB1 are detected to be equal to each other. The control signals Toff_b and Toff_r are changed into logical high, and the switches SLA1, SHB1, SLS1 and SLS2 are turned on. At this moment, the current ILA1 and ILB1 have the same direction, they both flow from the corresponding resonant tank into the corresponding switch node (SWA1, SWB1). During t0-t3, the current IFS1 is equal to a sum of the current ILA1 and ILB1, and the current IFS2 is equal to the current ILA1.

During t3-t4, the switches SHA1, SLB1, SFS1 and SFS2 are off, and the switches SLA1, SHB1, SLS1, and SLS2 are on. The converter 200 works in mode 2. The energy stored in the capacitor CB11 is discharged to the capacitor CB1 and the load R, and the energy stored in the capacitor CA1 is discharged to the load R.

At t4, a zero cross of the current ILS2 flowing through the switch SLS2 is detected. The control signal Toff_b is changed into logical low, and the switches SHB1 and SLS2 are turned off. During the subsequent time period until t6, the current ILB1 flows through the body diode of the switch SHB1.

At t5, a zero cross of the current ILS1 flowing through the switch SLS1 is detected. The control signal Toff_r is changed into logical low, and the switches SLA1 and SLS1 are turned off. Subsequently, the current ILA1 completes its commutation during the time period t5-t6.

At t6, the current ILA1 and ILB1 are detected to be equal to each other, and the control signals Ton_b and Ton_r are changed into logical high. The switches SHA1, SLB1, SFS1 and SFS2 are turned on, and the converter enters into a next switching cycle. The current ILA1 and ILB1 have the same direction at t6, they both flow out from the corresponding switch node to the corresponding resonant tank. During t3-t6, the current ILS1 is equal to a sum of the current ILA1 and ILB1, and the current ILS2 is equal to the current ILB1.

Figure 7:
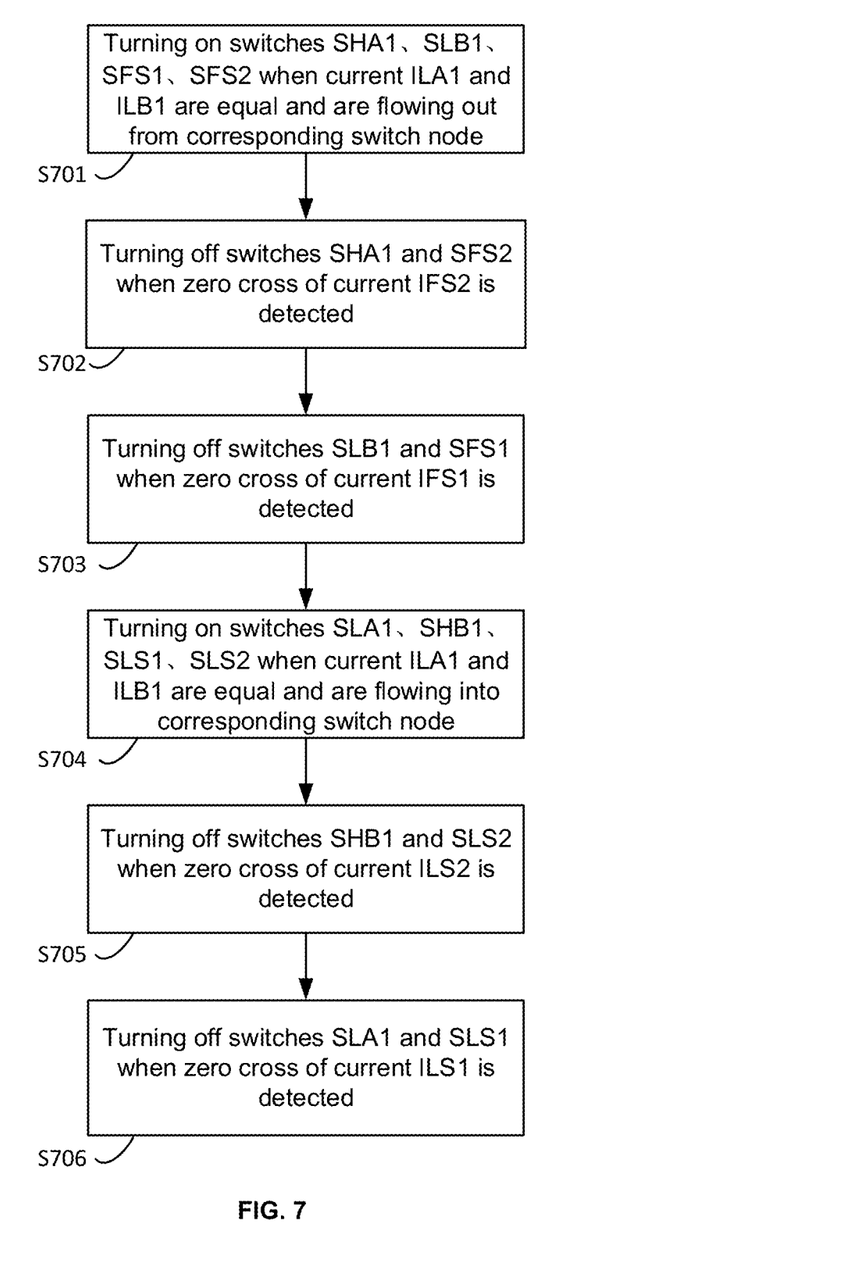
FIG. 7 is a flow chart of a control method used in switched tank converters, in accordance with an embodiment of the present invention.

FIG. 7 is a flow chart of a control method used in the switched tank converter 200 of FIG. 5, in accordance with an embodiment of the present invention. It includes steps S701-S706.

Step S701: turning on the switches SHA1, SLB1, SFS1 and SFS2, when it is detected that the current ILA1 and ILB1 both flow out from the corresponding switch node and are equal to each other.

Step S702: turning off the switches SHA1, SFS2, when a zero cross of the current IFS2 flowing through the switch SFS2 is detected.

Step S703: turning off the switches SLB1 and SFS1, when a zero cross of the current IFS1 flowing through the switch SFS1 is detected.

Step S704: turning on the switches SLA1, SHB1, SLS1 and SLS2, when it is detected that the current ILA1 and ILB1 both flow into the corresponding switch node and are equal to each other.

Step S705: turning off the switches SHB1 and SLS2, when a zero cross of the current ILS2 flowing through the switch SLS2 is detected.

Step S706: turning off the switches SLA1 and SLS1, when a zero cross of the current ILS1 flowing through the switch SLS1 is detected.

Figure 8:
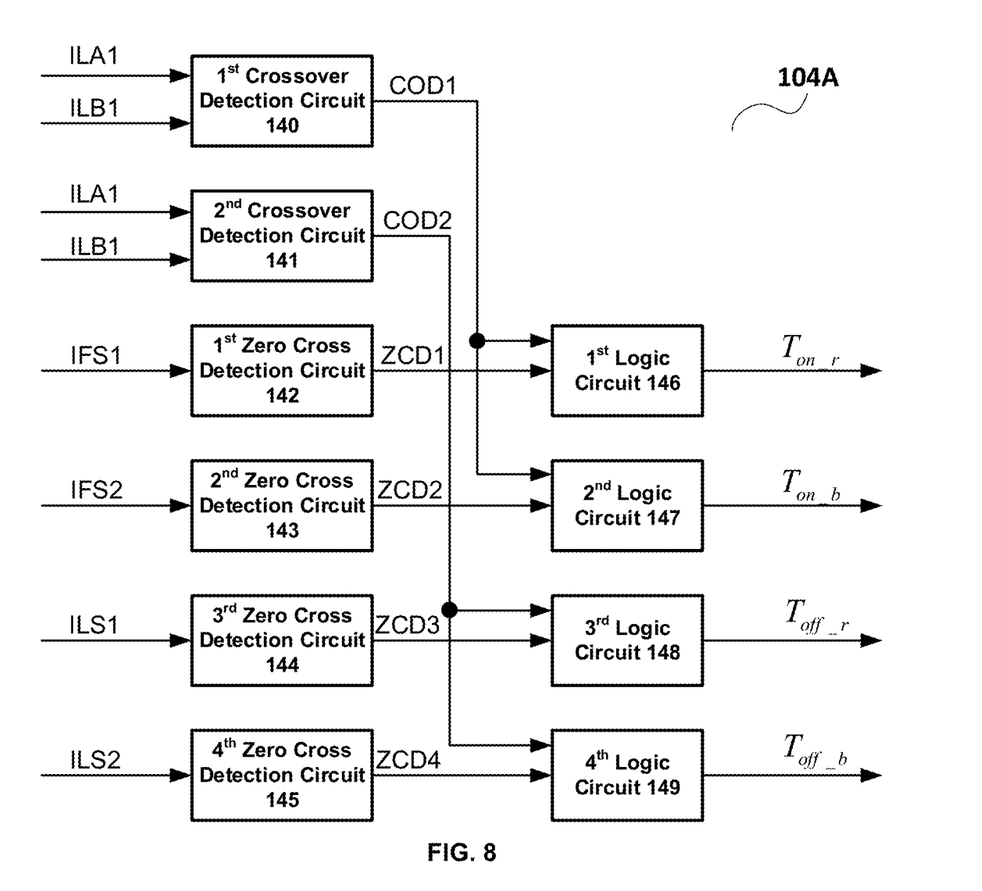
FIG. 8 is a block diagram of a controller 104A in accordance with an embodiment of the present invention.

FIG. 8 is a block diagram of a controller 104A, in accordance with an embodiment of the present invention. It includes a first crossover detection circuit 140, a second crossover detection circuit 141, a first zero cross detection circuit 142, a second zero cross detection circuit 143, and a third zero cross detection circuit 144, a fourth zero cross detection circuit 145, a first logic circuit 146, a second logic circuit 147, a third logic circuit 148, and a fourth logic circuit 149. The first crossover detection circuit 140 detects whether the current ILA1 and ILB1 both flow out from the corresponding switch node and are equal to each other, and generates a first crossover detection signal COD1. The second crossover detection circuit 141 detects whether the current ILA1 and ILB1 both flow into the corresponding switch node and are equal to each other, and generates a second crossover detection signal COD2. The first zero cross detection circuit 142 detects whether the current IFS1 flowing through the switch SFS1 crosses zero and generates a first zero cross detection signal ZCD1. The second zero cross detection circuit 143 detects whether the current IFS2 flowing through the switch SFS2 crosses zero and generates a second zero cross detection signal ZCD2. The third zero cross detection circuit 144 detects whether the current ILS1 flowing through the switch SLS1 crosses zero and generates a third zero cross detection signal ZCD3. The fourth zero cross detection circuit 145 detects whether the current ILS2 flowing through the switch SLS2 crosses zero and generates a fourth zero cross detection signal ZCD4. In some practical applications, the abovementioned detection circuits could sample the corresponding current (for example, through sensing resistors or current transformers, etc.), and conduct comparison operation based on the sampled signal to realize the corresponding detection function.

The first logic circuit 146 is coupled to the first crossover detection circuit 140 and the first zero cross detection circuit 142, and generates a control signal Ton_r to control the switches SLB1 and SFS1 based on the first crossover detection signal COD1 and first zero cross detection signal ZCD1. The second logic circuit 147 is coupled to the first crossover detection circuit 140 and the second zero cross detection circuit 143, and generates a control signal Ton_b to control the switches SHA1 and SFS2 based on the first crossover detection signal COD1 and second zero cross detection signal ZCD2. The third logic circuit 148 is coupled to the second crossover detection circuit 141 and the third zero cross detection circuit 144, and generates a control signal Toff_r to control the switches SLA1 and SLS1 based on the second crossover detection signal COD2 and the third zero cross detection signal ZCD3. The fourth logic circuit 149 is coupled to the second crossover detection circuit 141 and the fourth zero cross detection circuit 145, and generates a control signal Toff_b to control the switches SHB1 and SLS2 based on the second crossover detection signal COD2 and the fourth zero cross detection signal ZCD4.

In addition to detecting whether the current ILA1 and ILB1 are equal, in some embodiments, the controller 104 could also detect zero cross of the current ILA1 and ILB1 to respectively determine when to turn on the switches. For example, when it is detected that the current ILA1 and ILB1 have both finished their zero cross and changed their direction to flowing out from the corresponding switch node, the switches SHA1, SLB1, SFS1, and SFS2 are turned on. When the current ILA1 and ILB1 have both finished their zero cross and changed their direction to flowing into the corresponding switch node, the switches SLA1, SHB1, SLS1, and SLS2 are turned on. These variations could be understood by those skilled in the art and thus do not go beyond the scope of the invention.

Figure 9:
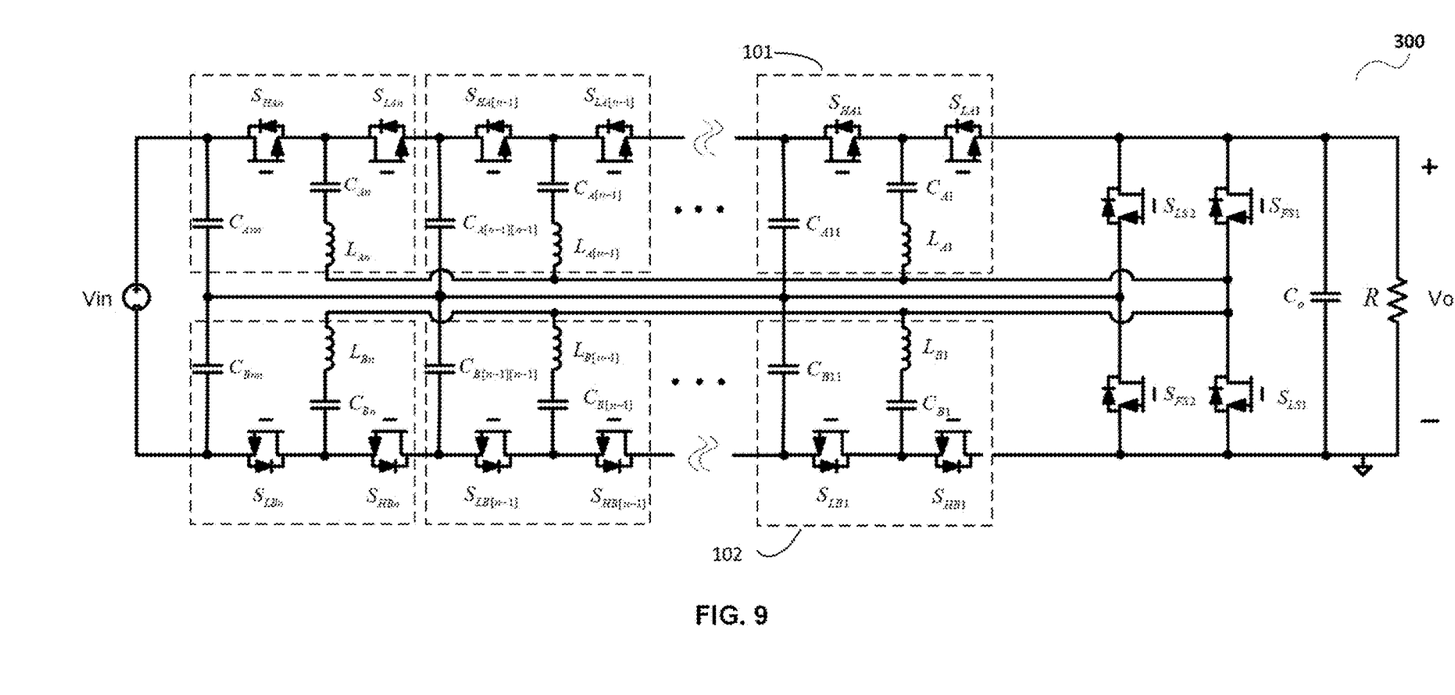
FIG. 9 schematically illustrates a switched tank converter 300 in accordance with an embodiment of the present invention.

In the foregoing embodiments, a switched tank converter with two conversion units and a conversion ratio (Vin/Vo) of 4:1 is taken as an example. People of ordinary skills in the art could understand, however, that the present invention is also applicable to other structures. FIG. 9 schematically illustrates a switched tank converter 300 according to an embodiment of the present invention. Compared to the embodiment shown in FIG. 2A, the converter of FIG. 9 further incorporate other conversion units coupled between the first conversion unit 101 and power supply, and also between the second conversion unit 102 and power supply. The internal structures of these conversion units are substantially same as that of 101 and 102. In this configuration, the relationship between the output voltage Vo and the input voltage Vin could be expressed as:

$$V_o = \frac{V_{in}}{2N}$$

Where N is the total number of conversion units, which is equal to 2n in the embodiment of FIG. 9.

With regard to the conversion units located in the $m^{th}$ column (m=1, 2, . . . , n), the voltage across their internal clamp capacitors CAmm and CBmm could be expressed as:

$$V_{CAmm} = V_{CBmm} = \frac{(2m-1)V_{in}}{2N}$$

The voltage stress sustained by resonant capacitors CAm and CBm can be expressed as:

$$V_{CAm} = V_{CBm} = \frac{(2m-1)V_{in}}{2N}$$

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

In some embodiments, the rectifier switches SFS1, SFS2, SLS1, SLS2 could be diodes, and the switches in the conversion units can be controllable semiconductor devices other than MOSFETs. Those skilled in the art can also understand that, in addition to the serial resonant architecture shown in the foregoing embodiments, some other resonant structures could also be adopted by the resonant tank, without departing from the scope of the present invention.

What is claimed is:

1. A switched tank converter comprising:
    a first conversion unit and a second conversion unit, wherein each of the conversion units has a first terminal, a second terminal, a third terminal, a fourth terminal and a switch node, and includes a clamp capacitor coupled between the first and third terminals, a high side switch coupled between the first terminal and the switch node, a low side switch coupled between the switch node and the second terminal, and a resonant tank coupled between the switch node and the fourth terminal, and wherein the second terminal of the first conversion unit is coupled to a first terminal of a load, the second terminal of the second conversion unit is coupled to a second terminal of the load, a first terminal of a power supply is coupled to the first terminal of the load through the first conversion unit, a second terminal of the power supply is coupled to the second terminal of the load through the second conversion unit; and
    a rectification unit having a first rectification switch, a second rectification switch, a third rectification switch and a fourth rectification switch, wherein each of the rectification switches has a first terminal and a second terminal, and wherein the first terminals of the first and fourth rectification switches are coupled to the first terminal of the load, the second terminals of the second and third rectification switches are coupled to the second terminal of the load, the second terminal of the first rectification switch and the first terminal of the third rectification switch are coupled to the fourth terminals of the first and second conversion units, the second terminal of the fourth rectification switch and the first terminal of the second rectification switch are coupled to the third terminals of the first and second conversion units wherein
    the switched tank converter has a first mode and a second mode, and wherein:
        during the first mode, the high side switch of the first conversion unit, the low side switch of the second conversion unit, the first rectification switch and the second rectification switch are on, the low side switch of the first conversion unit, the high side switch of the second conversion unit, the third rectification switch and the fourth rectification switch are off; and
        during the second mode, the high side switch of the first conversion unit, the low side switch of the second conversion unit, the first rectification switch and the second rectification switch are off, the low side switch of the first conversion unit, the high side switch of the second conversion unit, the third rectification switch and the fourth rectification switch are on.

2. The switched tank converter of claim 1, wherein the resonant tank includes a resonant capacitor, and a resonant inductor serially coupled to the resonant capacitor.

3. The switched tank converter of claim 1, further comprising a third conversion unit, wherein the first terminal of the third conversion unit is coupled to the first terminal of the power supply, the second terminal of the third conversion unit is coupled to the first terminal of the first conversion unit, the third terminal of the third conversion unit is coupled to the third terminal of the first conversion unit, the fourth terminal of the third conversion unit is coupled to the fourth terminal of the first conversion unit.

4. The switched tank converter of claim 1, further comprising a fourth conversion unit, wherein the first terminal of the fourth conversion unit is coupled to the second terminal of the power supply, the second terminal of the fourth conversion unit is coupled to the first terminal of the second conversion unit, the third terminal of the fourth conversion unit is coupled to the third terminal of the second conversion unit, the fourth terminal of the fourth conversion unit is coupled to the fourth terminal of the second conversion unit.

5. The switched tank converter of claim 1, wherein the first, second, third and fourth rectification switches are diodes.

6. The switched tank converter of claim 1, further comprising a controller, wherein:
    based on current flowing through the resonant tanks in the first and second conversion units, the controller determines when to turn on the high side switch of the first conversion unit, the low side switch of the second conversion unit, the first rectification switch and the second rectification switch, and when to turn on the low side switch of the first conversion unit, the high side switch of the second conversion unit, the third rectification switch and the fourth rectification switch; and
    the controller further detects whether current flowing through the first, second, third and fourth rectification switches crosses zero, and wherein based on the detection result, the controller respectively determines when to turn off the low side switch of the second conversion unit and the first rectification switch, when to turn off the high side switch of the first conversion unit and the second rectification switch, when to turn off the low side switch of the first conversion unit and the third rectification switch, and when to turn off the high side switch of the second conversion unit and the fourth rectification switch.

7. A controller used in the switched tank converter of claim 1, wherein:
    based on current flowing through the resonant tanks in the first and second conversion units, the controller determines when to turn on the high side switch of the first conversion unit, the low side switch of the second conversion unit, the first rectification switch and the second rectification switch, and when to turn on the low side switch of the first conversion unit, the high side switch of the second conversion unit, the third rectification switch and the fourth rectification switch; and
    the controller further detects whether current flowing through the first, second, third and fourth rectification switches crosses zero, and wherein based on the detection result, the controller respectively determines when to turn off the low side switch of the second conversion unit and the first rectification switch, when to turn off the high side switch of the first conversion unit and the second rectification switch, when to turn off the low side switch of the first conversion unit and the third rectification switch, and when to turn off the high side switch of the second conversion unit and the fourth rectification switch.

8. The controller of claim 7, comprising:
a first crossover detection circuit, configured to detect whether the current flowing through the resonant tanks in the first and second conversion units are equal and are respectively flowing out from the corresponding switch node, and generate a first crossover detection signal;
a second crossover detection circuit, configured to detect whether the current flowing through the resonant tanks in the first and second conversion units are equal and are respectively flowing into the corresponding switch nod, and generate a second crossover detection signal;
a first zero cross detection circuit, configured to detect whether the current flowing through the first rectification switch crosses zero and generate a first zero cross detection signal;
a second zero cross detection circuit, configured to detect whether the current flowing through the second rectification switch crosses zero and generate a second zero cross detection signal;
a third zero cross detection circuit, configured to detect whether the current flowing through the third rectification switch crosses zero and generate a third zero cross detection signal;
a fourth zero cross detection circuit, configured to detect whether the current flowing through the fourth rectification switch crosses zero and generate a fourth zero cross detection signal;
a first logic circuit coupled to the first crossover detection circuit and the first zero cross detection circuit, wherein based on the first crossover detection signal and the first zero cross detection signal, the first logic circuit generates a first control signal to control the low side switch of the second conversion unit and the first rectification switch;
a second logic circuit coupled to the first crossover detection circuit and the second zero cross detection circuit, wherein based on the first crossover detection signal and the second zero cross detection signal, the second logic circuit generates a second control signal to control the high side switch of the first conversion unit and the second rectification switch;
a third logic circuit coupled to the second crossover detection circuit and the third zero cross detection circuit, wherein based on the second crossover detection signal and the third zero cross detection signal, the third logic circuit generates a third control signal to control the low side switch of the first conversion unit and the third rectification switch; and
a fourth logic circuit coupled to the second crossover detection circuit and the fourth zero cross detection circuit, wherein based on the second crossover detection signal and the fourth zero cross detection signal, the fourth logic circuit generates a fourth control signal to control the high side switch of the second conversion unit and the fourth rectification switch.

9. A control method used in the switched tank converter of claim 1, comprising:
based on current flowing through the resonant tanks in the first and second conversion units, determining when to turn on the high side switch of the first conversion unit, the low side switch of the second conversion unit, the first rectification switch and the second rectification switch, and when to turn on the low side switch of the first conversion unit, the high side switch of the second conversion unit, the third rectification switch and the fourth rectification switch;
detecting whether current flowing through the first, second, third and fourth rectification switches crosses zero; and
based on the detection result, respectively determining when to turn off the low side switch of the second conversion unit and the first rectification switch, when to turn off the high side switch of the first conversion unit and the second rectification switch, when to turn off the low side switch of the first conversion unit and the third rectification switch, and when to turn off the high side switch of the second conversion unit and the fourth rectification switch.

10. The control method of claim 9, further comprising:
turning on the high side switch of the first conversion unit, the low side switch of the second conversion unit, the first rectification switch and the second rectification switch, when the current flowing through the resonant tanks in the first and second conversion units are equal and are respectively flowing out from the corresponding switch node;
turning off the high side switch of the first conversion unit and the second rectification switch, when a zero cross of the current flowing through the second rectification switch is detected;
turning off the low side switch of the second conversion unit and the first rectification switch, when a zero cross of the current flowing through the first rectification switch is detected;
turning on the low side switch of the first conversion unit, the high side switch of the second conversion unit, the third rectification switch and the fourth rectification switch, when the current flowing through the resonant tanks in the first and second conversion units are equal and are respectively flowing into the corresponding switch node;
turning off the high side switch of the second conversion unit and the fourth rectification switch, when a zero cross of the current flowing through the fourth rectification switch is detected; and
turning off the low side switch of the first conversion unit and the third rectification switch, when a zero cross of the current flowing through the third rectification switch is detected.

* * * * *